United States Patent [19]

Sano

[11] Patent Number: 4,998,451
[45] Date of Patent: Mar. 12, 1991

[54] LINE PRESSURE CONTROL ARRANGEMENT FOR AUTOMATIC AUTOMOTIVE TRANSMISSION

[75] Inventor: Akihiko Sano, Fujisawa, Japan

[73] Assignee: Nissan Motor Co., Ltd., Yokohama, Japan

[21] Appl. No.: 376,287

[22] Filed: Jul. 6, 1989

[30] Foreign Application Priority Data

Jul. 6, 1988 [JP] Japan .................. 63-166983

[51] Int. Cl.⁵ .............................................. B60K 41/18
[52] U.S. Cl. ......................................... 74/867; 74/866
[58] Field of Search ................................ 74/866, 867

[56] References Cited

U.S. PATENT DOCUMENTS

| 4,388,844 | 6/1983 | Arai et al. | 74/867 X |
| 4,653,350 | 3/1987 | Downs et al. | 74/864 |
| 4,843,922 | 7/1989 | Kashihara | 74/867 X |

FOREIGN PATENT DOCUMENTS 1-169164  7/1989  Japan .

Primary Examiner—Dirk Wright
Attorney, Agent, or Firm—Foley & Lardner

[57] ABSTRACT

A line pressure control system features the use of a self-adjusting arrangement wherein the total shift time is determined and compared with a target time for the instant shift. The line pressure control duty cycle is modified until the line pressure level is adjusted in a manner which reduces the difference between the actual total shift time and the target value, to zero.

9 Claims, 10 Drawing Sheets

LINE PRESSURE CONTROL ARRANGEMENT FOR AUTOMATIC AUTOMOTIVE TRANSMISSION

BACKGROUND OF THE INVENTION

1. Field of the Invention

The present invention relates generally to an automatic automotive transmission and more specifically to a line pressure control arrangement for such a transmission.

2. Description of the Prior Art

An automatic transmission Service Manual (publication A261C07) issued in March 1987 relating to the so called RE4R01A type transmission describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

However, the solenoids used for the purposes of line pressure control and the friction elements used in a given transmission, inevitably exhibit a unit to unit variation and/or exhibit a change in characteristics with the passing of time due to wear and the like deterioration. These changes and/or unit to unit variations cannot be compensated as it not possible to change the line pressure control valve duty cycle.

Accordingly, the control characteristics tend to deteriorate to the point of permitting strong shift shocks and/or excessive friction element slippage which shortens the working life of the friction elements per se.

As shown in the timing chart of FIG. 9, when the engine is operating at very low throttle settings and the basic level of the line pressure is reduced, and the transmission and a shift control solenoid is switched from an energized condition to a de-energized (at time t1) in a manner to produce a 1-2 upshift; the level of the pressure which is supplied to a given friction element to induce the engagement of the same, varies as indicated by the solid line trace. In response to this the rotational speed ratio (viz., Nt/No) which occurs between the transmission input and output shafts varies, as shown by the solid line trace, from the value produced by first speed operation (first gear) to that which is produced by second speed (second gear) operation. On the other hand, if the line pressure is higher, the pressure development and the change in the rotation speed ratio Nt/No change in the manner indicated by the broken line.

In accordance with the above, the torque which appears on the output shaft of the transmission varies in the case of the low line pressure level in the manner indicated by the solid line and in the manner indicated by the broken line in the case of the higher level.

Accordingly, it is possible to determine from the inertia phase period (T2) if the above mentioned wear and unit to unit variation factors have exerted an influence on the operational characteristics of the transmission for the instant level of line pressure.

DESCRIPTION OF RELATED ART

Japanese Patent Application No. 62-327452, filed Dec. 25, 1987, and available Jul. 4, 1989, as Japanese Application Publication No. 1-169164 corresponding to U.S. application Ser. No. 07/289,050, discloses an arrangement wherein the rotational speeds of the input and output shafts are monitored and the respective rotational speed sensors used to calculate the length of the inertia phase; the calculated inertia time is compared with a target valve; and level of line pressure is adjusted in accordance with the difference between the two.

However, experiments revealed that if the line pressure was adjusted based on the length of the inertia phase during shifting and, for example, an upshift was induced with the throttle opening above a predetermined level the inertia phase time varied as depicted in FIG. 8a, while in the case that the throttle setting was reduce to an ultra low level, the inertia phase time varied as indicated in FIG. 8b.

Because of this, it was very difficult to accurately determine if the line pressure was adequate or not and thus rendered it very difficult to revise the line pressure control in in the desired manner.

On the other hand, it was noted that if the total shift time (viz., the time required for the Nt/No ratio to change from that indicative of first gear operation to that indicative of second gear) was recorded and compared with the inertia phase time. From this it was noted that a clear effect on the total time was caused by a given change in line pressure and that the change was largely independent of the throttle valve opening.

SUMMARY OF THE INVENTION

It is an object of the present invention to provide a line pressure control arrangement which is capable of adjusting itself in a manner which enables the level of line pressure to be regulated to a level appropriate for the instant set of operating conditions even at low throttle settings.

In brief, the above object is achieved by an arrangement which determines the total shift time and compares with this time with a target time for the instant shift. The line pressure control duty cycle is modified until the line pressure is adjusted in a manner which reduces the difference between the actual total shift time and the target value, to zero.

More specifically, a first aspect of the present invention is deemed to comprise a transmission line pressure control arrangement which features: a transmission input shaft rotational speed sensor; a transmission output shaft rotational speed sensor; means for deriving a ratio of the transmission input shaft rotation speed to the transmission output shaft rotational speed; total shift time determining means for determining the total shift time which is defined between the point in time a shift command is issued and the point in time the ratio is detected as having changed from that indicative of a first predetermined gear to that indicative of a second predetermined gear; and means for adjusting the line pressure in a manner which brings the total shift time to a target value for the instant shift.

A second aspect of the present invention is deemed to comprise a method of controlling transmission line pressure which features the steps of: sensing a transmission input shaft rotational speed; sensing a transmission output shaft rotational speed; deriving a ratio of the input shaft rotation speed to the output shaft rotational speed; determining the total shift time which is defined between the point in time a shift command is issued and the point in time the ratio is detected as having changed from that indicative of a first predetermined gear to that indicative of a second predetermined gear; and adjusting the line pressure in a manner which brings the total shift time to a target value for the instant shift.

A third aspect of the present invention is deemed to comprise a method of controlling transmission line pressure in a transmission which is operatively connected with an engine and which includes means for producing a shift command signal, the engine having a load sensor, the method featuring the steps of: sensing the rotational speed of an input shaft of the transmission; sensing rotational speed of an output shaft of the transmission; deriving a ratio of the input shaft rotation speed to the output shaft rotational speed; sensing the engine load being below a predetermined value; determining the total shift time which is defined between the point in time the shift command signal is issued and the point in time the ratio is detected as having changed from that indicative of a first predetermined gear to that indicative of a second predetermined gear; and adjusting the line pressure in a manner which brings the total shift time to a target value for the instant shift.

A fourth aspect of the present invention is deemed to comprise a method of controlling transmission line pressure in a transmission which is operatively connected with an engine and which includes means for producing a shift command signal, the engine having a load sensor; comprising the steps of: determining the value of a line pressure control signal based on the instant engine load as sensed by the engine load sensor; sensing the rotational speed of an input shaft of the transmission; sensing rotational speed of an output shaft of the transmission; deriving a ratio of the input shaft rotation speed to the output shaft rotational speed; determining a total shift time, the total shift time being defined between the point in time the shift command signal is issued and the point in time the ratio is detected as having changed from that indicative of a first predetermined gear to that indicative of a second predetermined gear; determining a inertia phase time, the inertia phase time being defined between the point in time following the issuance of a shift command signal that the gear ratio deviates from that indicative of the instant gear ratio and the point in time where the ratio assumes the value of the gear to which is designated by the shift command signal; using the engine load to determine a target total shift time from a first set of pre-memorized data; using the total shift time to adjust the value of a line pressure control signal which changes the line pressure and which brings the total shift time to a target value for the instant shift when the engine load is below a preselected level; using the engine load to determine a target inertia time from a second set of pre-memorized data; and using the inertia time to adjust the value of a line pressure control signal in a manner which changes the line pressure and which brings the inertia time to the target inertia time when the engine load is above the preselected level.

A fifth aspect of the present invention is deemed to comprise a line pressure control arrangement for a transmission which is operatively connected with an engine and which includes means for producing a shift command signal, the engine having a load sensor, the line pressure control arrangement featuring: means for determining the value of a line pressure control signal based on the instant engine load as sensed by the engine load sensor; means for sensing the rotational speed of an input shaft of the transmission; means for sensing rotational speed of an output shaft of the transmission; means for deriving a ratio of the input shaft rotation speed to the output shaft rotational speed; means for determining a total shift time, the total shift time being defined between the point in time the shift command signal is issued and the point in time the ratio is detected as having changed from that indicative of a first predetermined gear to that indicative of a second predetermined gear; means for determining a inertia phase time, the inertia phase time being defined between the point in time following the issuance of a shift command signal that the gear ratio deviates from that indicative of the instant gear ratio and the point in time where the ratio assumes the value of the gear to which is designated by the shift command signal; means for using the engine load to determine a target total shift time from a first set of pre-memorized data; means for using the total shift time to adjust the value of a line pressure control signal which changes the line pressure and which brings the total shift time to a target value for the instant shift when the engine load is below a preselected level; means for using the engine load to determine a target inertia time from a second set of pre-memorized data; and means for using the inertia time to adjust the value of a line pressure control signal in a manner which changes the line pressure and which brings the inertia time to the target inertia time when the engine load is above the preselected level.

A sixth aspect of the present invention is deemed to comprise a vehicle, which features: an engine; a load sensor for sensing the load on the engine; a transmission, the transmission being operatively connected with the engine by clutch means, the transmission including a friction element, an input shaft and an output shaft; a transmission control arrangement, the transmission control arrangement including: a line pressure control valve, the line pressure control valve being arranged to control the level of a line pressure; a shift control valve, the shift control valve being responsive to a shift command signal to selectively supply line pressure to the friction element; a transmission input shaft rotational speed sensor for sensing the rotational speed of the input shaft; a transmission output shaft rotational speed sensor for sensing the rotational speed of the output shaft; a control unit, the control unit being responsive to the output of the engine load sensor, the transmission input shaft rotational speed sensor and the output shaft rotational speed sensor, the control unit including means for: producing the shift command signal; producing the line pressure control signal; deriving a ratio of the input shaft rotation speed to the output shaft rotational speed; determining a total shift time, the total shift time being defined between the point in time the shift command signal is issued and the point in time the ratio is detected as having changed to the gear nominated by the shift control signal; using the engine load to determine a target total shift time from a first set of pre-memorized data; and using the total shift time to adjust the value of a line pressure control signal which changes the line pressure and which brings the total shift time to a target value for the instant shift when the engine load is below a preselected level.

DETAILED DESCRIPTION OF THE PREFERRED EMBODIMENT

Figure 1:
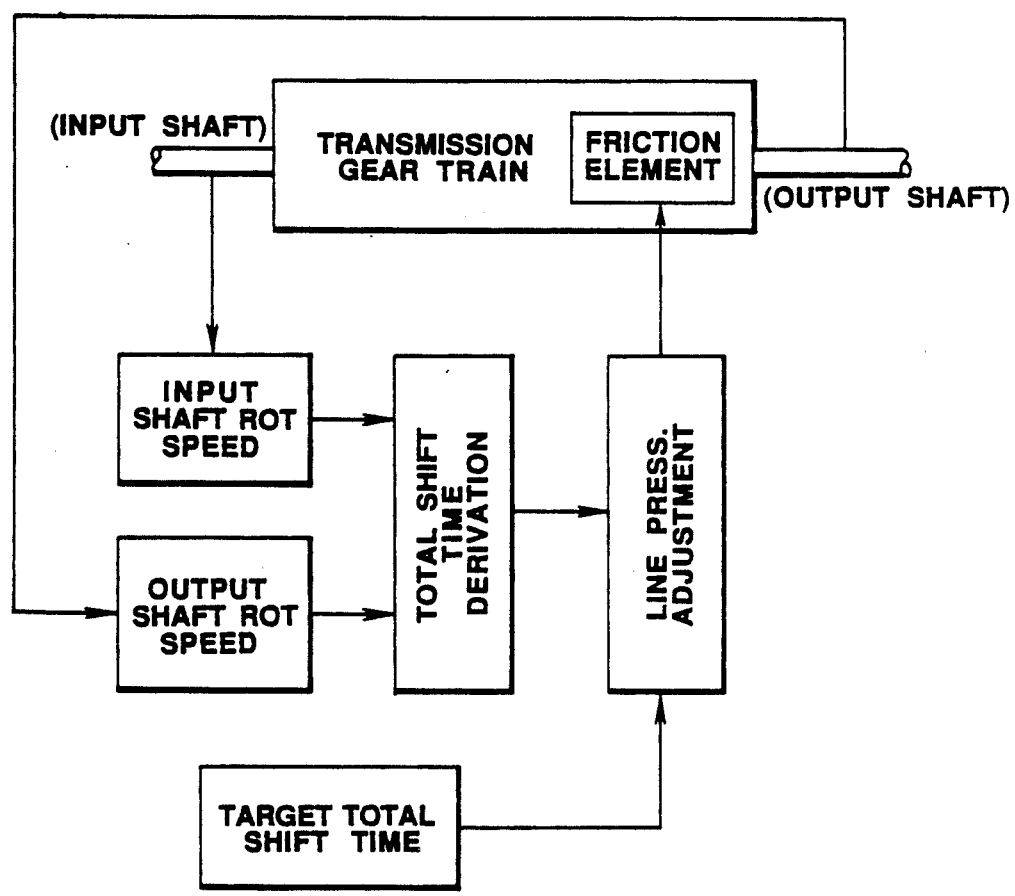
FIG. 1 is a block diagram which depicts the concept of the present invention.
Figure 2:
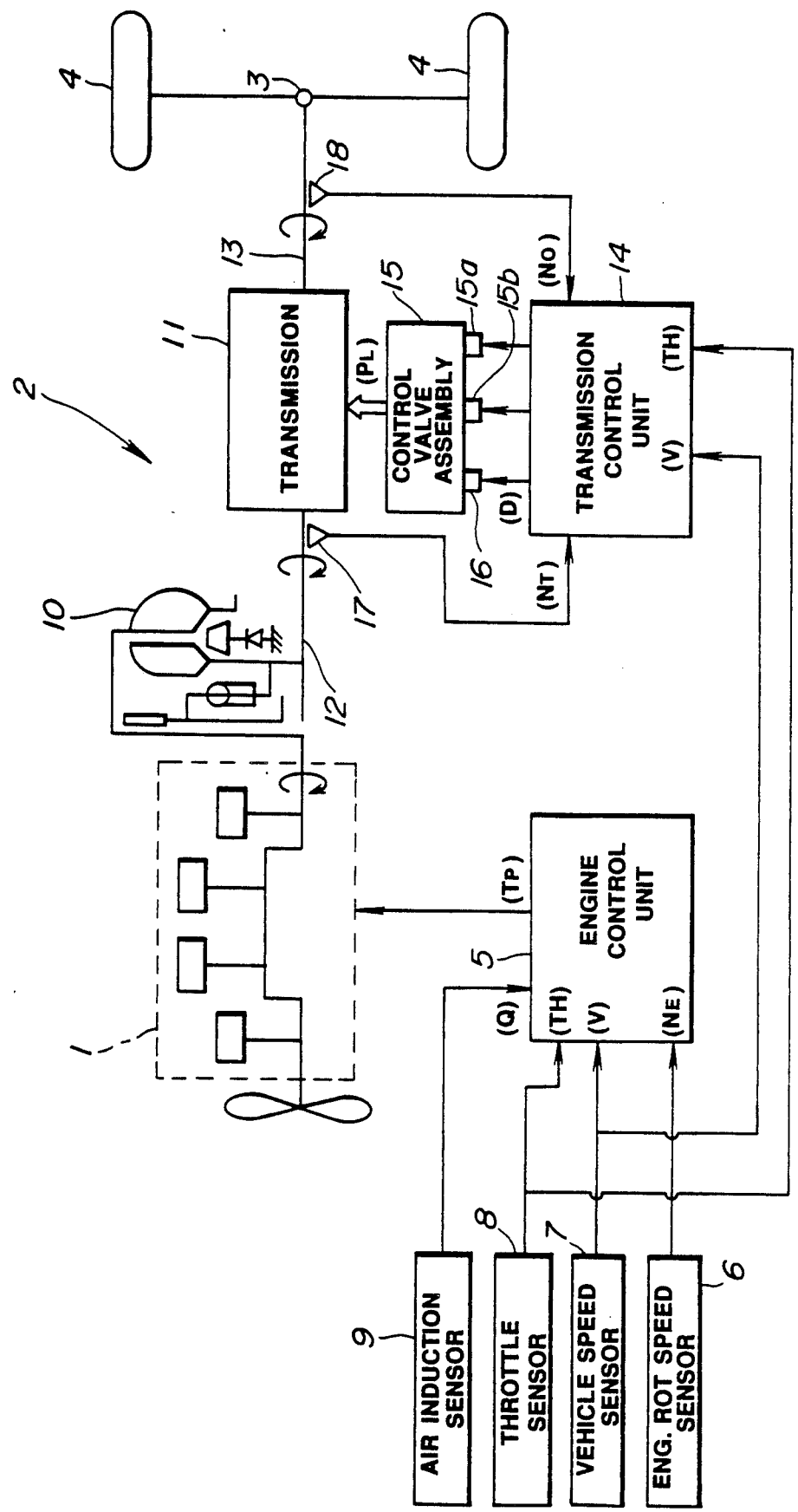
FIG. 2 is a schematic diagram showing and engine/transmission arrangement to which includes an embodiment of the present invention.

FIG. 1 shows a power train to which an embodiment of the present invention is applied. In this arrangement an electronically fuel injected internal combustion engine 1 is operatively connected by way of a power train (generally denoted by the numeral 2) with a differential gear 3. Driving wheels 4 are connected to the differential 3.

It should be understood that even though FIG. 1 shows a F-R power train (front engine - rear wheel drive) the present invention is not limited to the same and can be applied to FF, MR˙ or four-wheel drive 4WD type arrangements if so desired.

The engine control system includes an engine control unit 5 which is supplied inputs from an engine speed sensor 6, a vehicle speed sensor 7, a throttle position sensor 8, and an air induction sensor 9.

Based on the inputs of sensors 6 to 9, the control unit 5 which in this instance includes a microprocessor (not show), derives the appropriate injection control pulse width and applies the same to the fuel supply system of the engine.

In this embodiment, the power train 2 includes a RE4R01A type transmission developed by NISSAN MOTOR CO. LTD., the construction and arrangement of which is described in detail in the Service Manual A261C07 published by the above mentioned company.

A torque converter 10 including a lock-up clutch provides an operative connection between the output shaft of the engine and an input shaft 12 of a gear train 11. A transmission output shaft 13 provides a drive connection between the differential or final gear 3 and the transmission.

The system includes a transmission control unit 14 which also includes a microprocessor. This unit 14 is arranged to issue control signals to a control valve assembly 15 which forms part of the transmission. The control valve assembly 15 includes three solenoids 15a, 15b and 16.

In this embodiment the transmission includes a gear train comprising a plurality of planetary gear units, and associated hydraulically operated clutches and brakes (not shown). The brakes and clutches are operated by the supply of so called "line pressure" PL which is selectively supplied from the control valve unit 15.

Depending on the energization of solenoids 15a and 15b, the transmission is conditioned to selectively produce a number of different gear ratios by selectively inducing line pressure PL to be supplied to the appropriate friction elements.

In this instant arrangement four forward gear ratios of the transmission can be produced in the manner indicated in the table below.

TABLE 1

| GEAR: | FIRST | SECOND | THIRD | FOURTH |
| --- | --- | --- | --- | --- |
| SOL. 15 a: | ON | OFF | OFF | ON |
| SOL. 15 b: | ON | ON | OFF | OFF |

The third solenoid 16 of the control valve unit 15 is arranged to be operated on a variable duty cycle and to control the level of the line pressure PL. With this arrangement as the duty cycle increases the level of the line pressure is arranged to increase.

The shift control unit 14 is arranged to receive data inputs NT and NO from rotational speed sensors 17 and 18 respectively. As will be appreciated from the drawings, NT is indicative of the rotational speed of the input shaft 12 of the transmission while NO is indicative of the rotational speed of the transmission output shaft 13.

It is worth noting that the output of the sensor 18 can be used additionally as a vehicle speed indicative signal if so desired.

Figure 3:
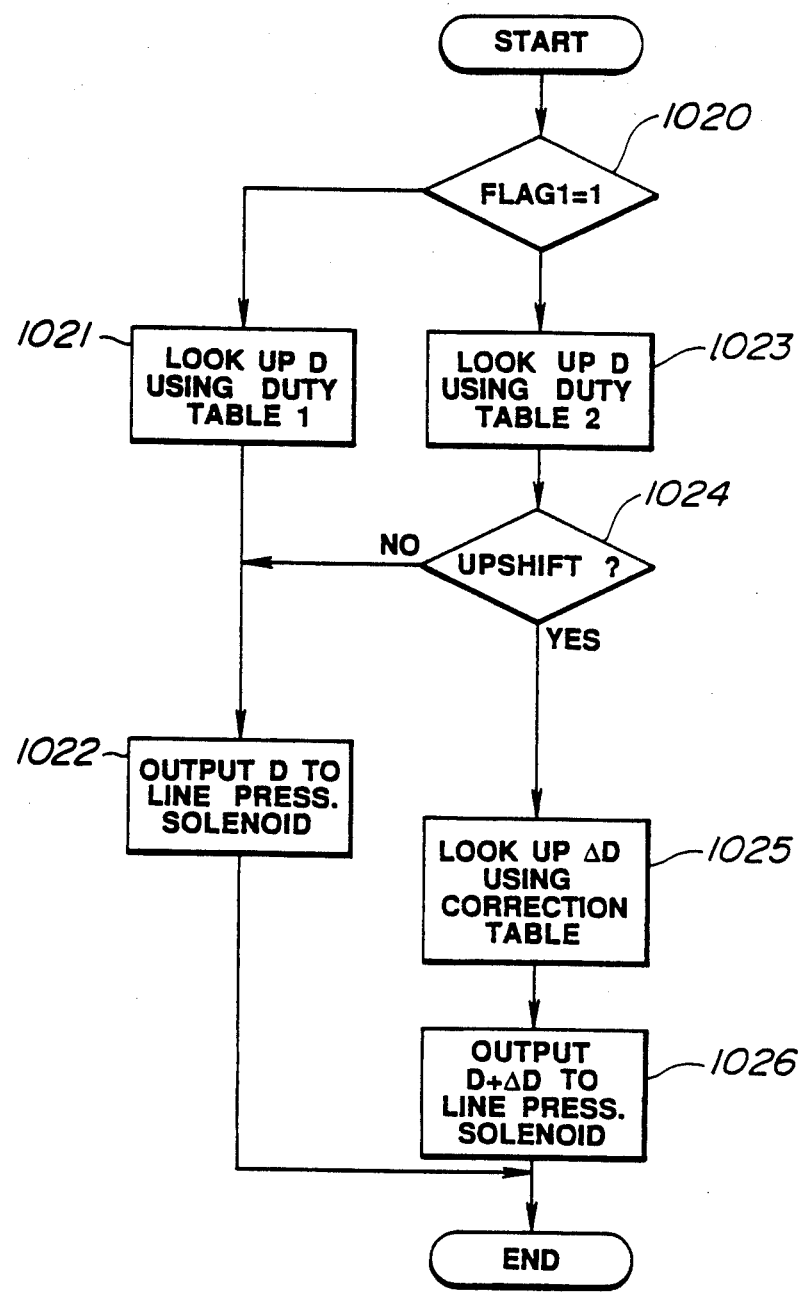
FIGS. 3 to 6 are a flow charts depicting the steps which characterize the line pressure control according to the present invention.
Figure 5:
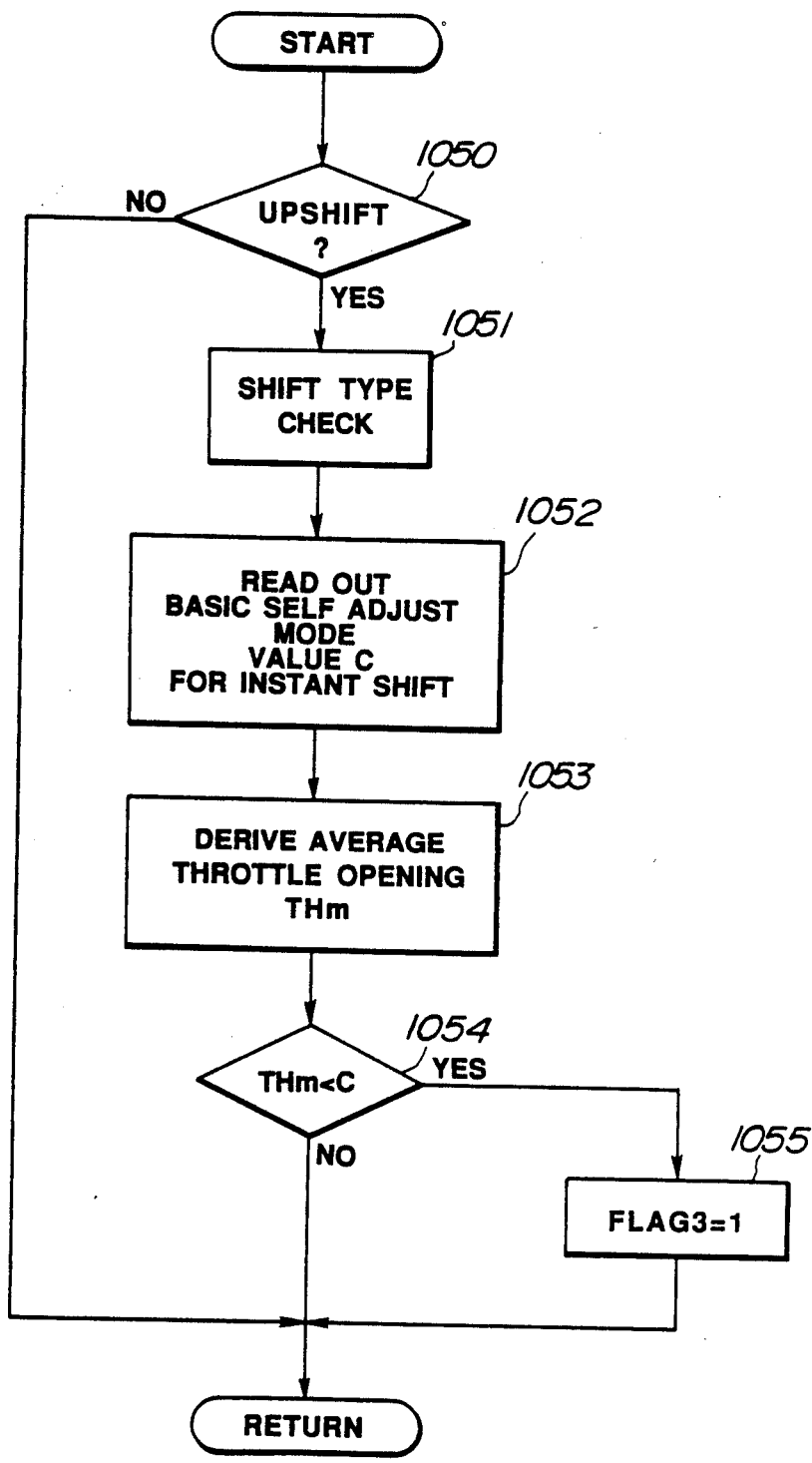

This unit 14 further receives data inputs V and TH from the vehicle speed sensor 7 and the throttle position sensor 8. Programs of the nature depicted in the flow charts of FIGS. 3 and 5 are run in the shift control unit microprocessor in order to derive the appropriate control signals. In this embodiment the line pressure routine shown in FIG. 3 is arranged to be run at 10 msec intervals (by way of example). As shown, the first step of this program is such as to determine the status of a shift status flag FLAG1 and to determine if it hash been set (i.e. set=1) or not. In the event that it is found that the shift status flag has not yet been set, indicating that a shift is not in progress, the routine flows to step 1021 wherein a table of the nature depicted by the solid line trace depicted FIG. 7 which is recorded in RAM is used to determine the instant line pressure control duty cycle (D %) for the instant value of TH (throttle opening). Following this the routine enters step 1022 wherein commands which induce the output of a signal having the duty cycle just looked up are output to the solenoid 16.

Figure 7:
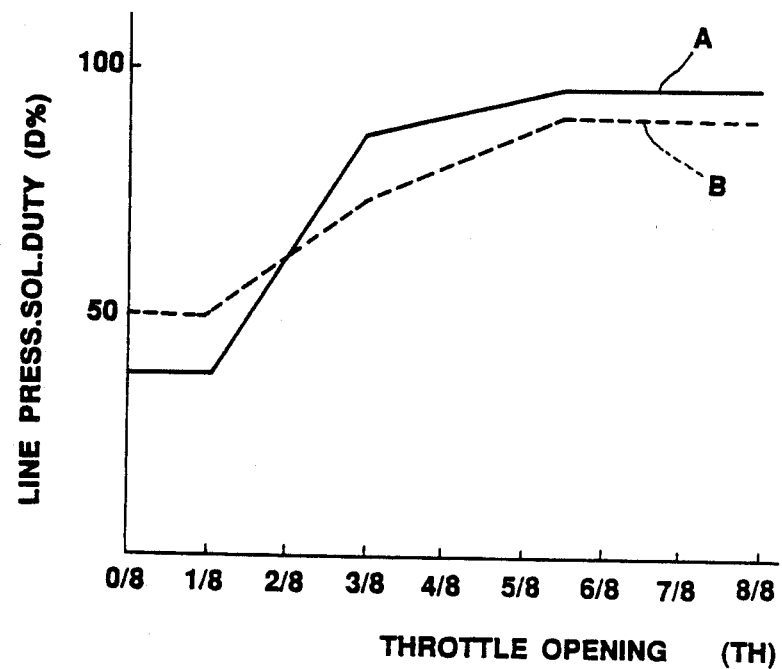
FIG. 7 is a map which is recorded in terms of line pressure solenoid duty cycle and throttle opening and which is used in the instant embodiment of the present invention.

On the other hand, if the shift status flag FLAG1 is found to have been set to 1 (indicating that a shift is in progress) then the routine flows to step 1023 wherein a table of the nature depicted by the chain line trace depicted FIG. 7 which is also recorded in RAM, is used to determine the instant line pressure control duty cycle (D %) for the instant value of TH (throttle opening).

Figure 8:
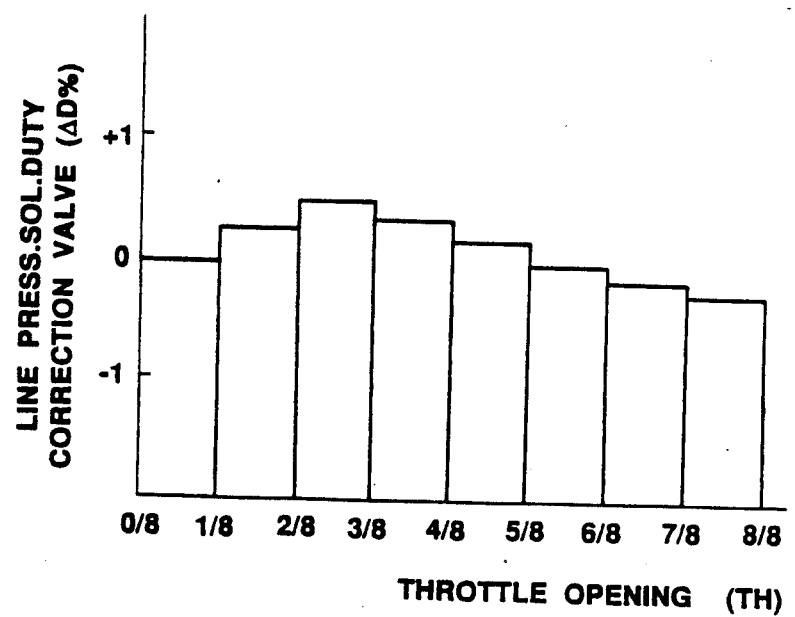
FIG. 8 is a map which is recorded in terms of line pressure duty cycle correction value (ΔD %) and throttle opening, and which is used in the instant embodiment of the present invention.
Figure 9:
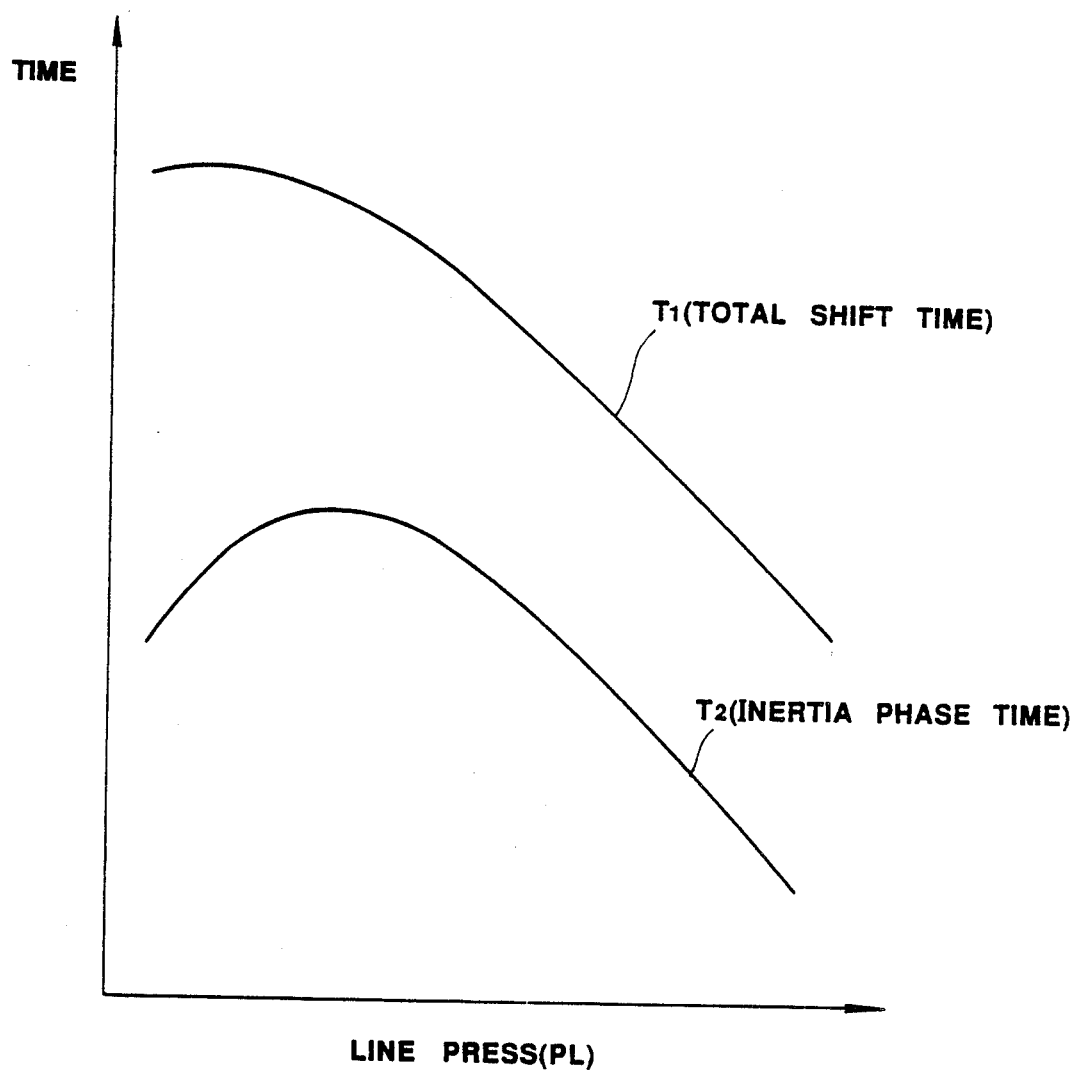
FIGS. 9 and 10 are graphs discussed in the opening paragraphs of the instant disclosure which are recorded in terms of time and line pressure and which compare the total shift time characteristics with the intertia phase time for two different throttle valve settings.
Figure 10:
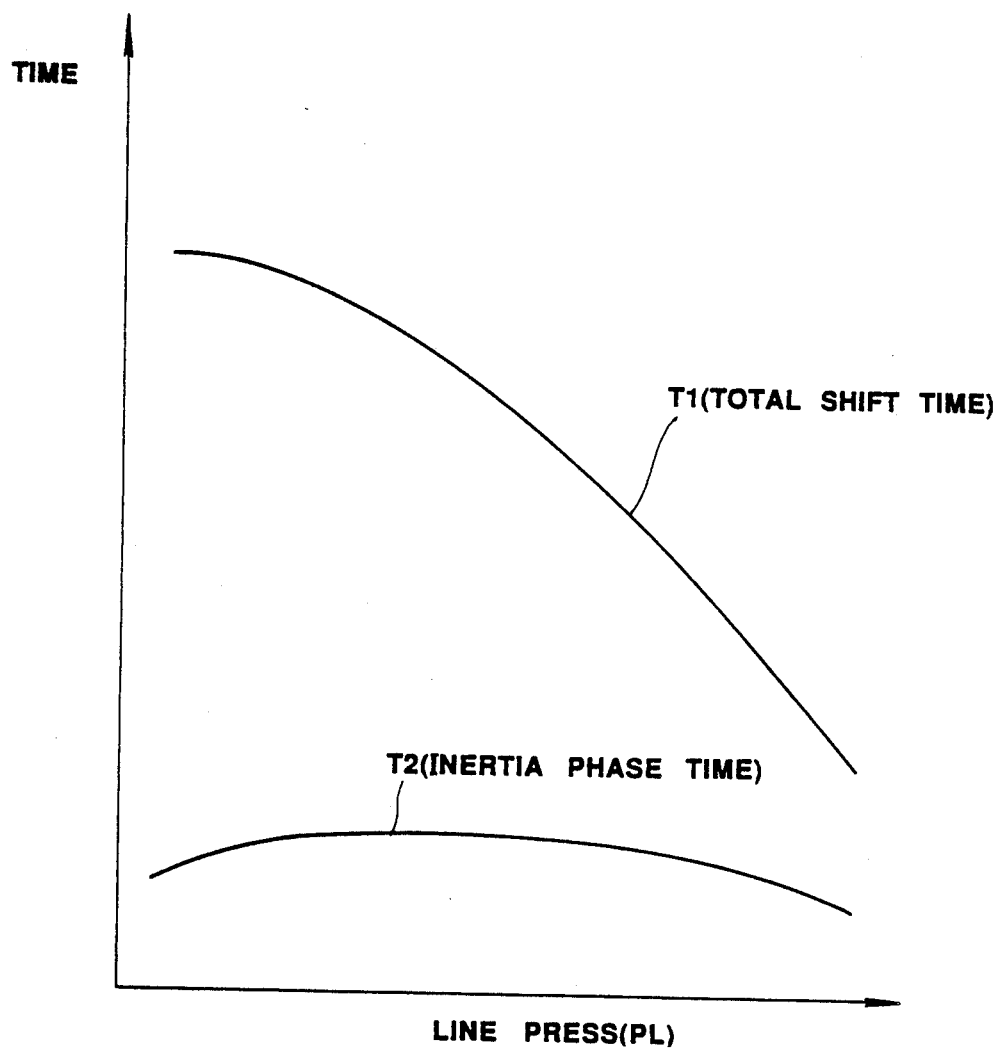

At step 1024 in order to obviate shift shock which tends to result from overly elevated line pressure during upshifts, it is determined if the shift which is being implemented is an upshift or not. In accordance with the outcome of this enquiry if the outcome is such as to indicate that a downshift is taking place, then the routine flows across to step 1022 and the duty cycle which was determined in step 1021 during a previous run of the routine. However, in the event that an upshift is occurring, then at step 1025 then a duty cycle correction table of the nature shown in FIG. 8 for example, is used to look up a self-correction value ΔD. The nature of this self-correction value will become more clearly explained later. Following this the self-correction ΔD value is added to the instant duty cycle D and the result used to control the level of line pressure.

Figure 4:
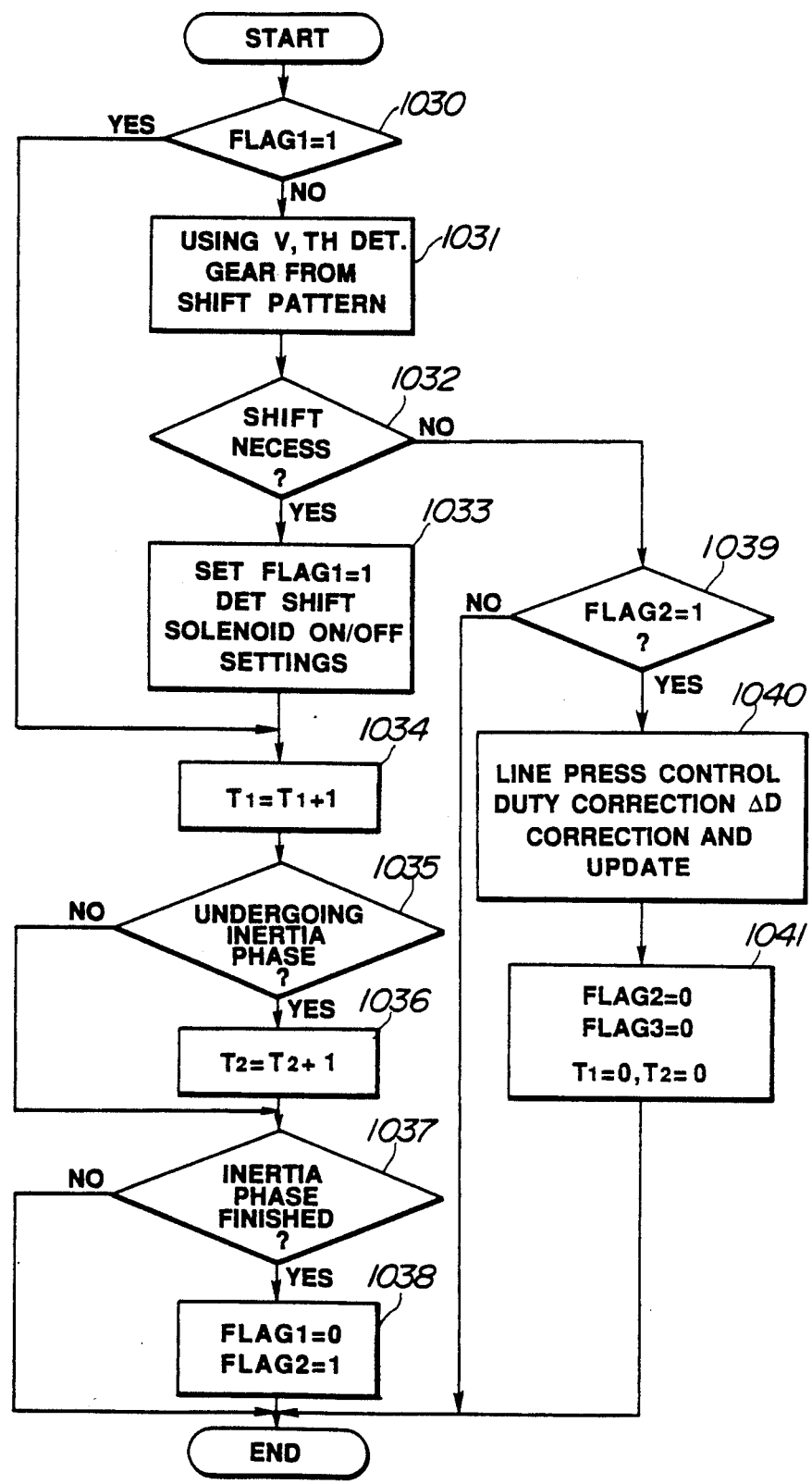

FIG. 4 shows a routine which is run at predetermined time intervals and which is used to control the shifting of the transmission and amount of correction of the line pressure control valve duty cycle. The first step of this routine is such as ascertain if the shift status FLAG1 has been set or not. In the case the transmission is not undergoing a shift (FLAG1=0) the routine flows to step 1031 wherein the instant vehicle speed and throttle valve opening degrees V and TH are read and used in combination with a pre-recorded shift pattern to determine which gear the transmission should be conditioned to produce. Following this, in step 1032 the instant gear and the one determined in the predetermined step are compared and the determination made as to whether a shift is necessary or not. In the event that the instant gear and the one determined in step 1031 are not the same, then at step 1033 the shift status FLAG1 is set=1 and the necessary ON/OFF settings of the shift solenoids 15a and 15b are determined. In addition to this the instant value of TH is written as a value THs. The use of this value will become understood when a disclosure of the flow chart shown in FIG. 5 is given.

Figure 11:
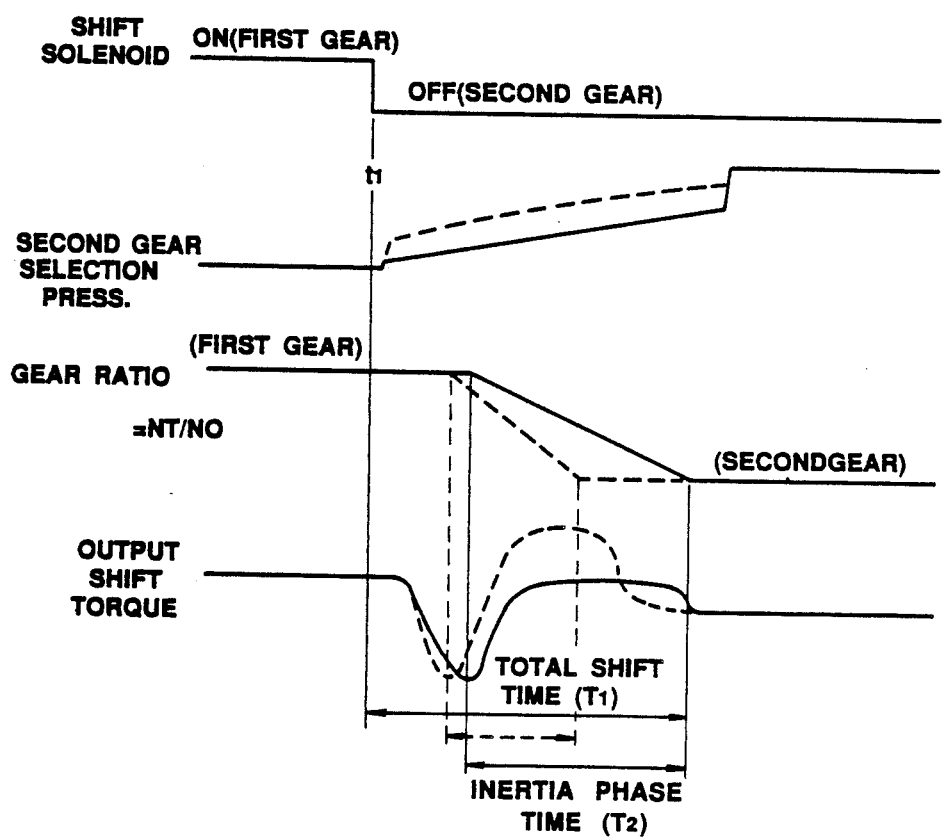
FIG. 11 is a timing chart which demonstrates the effect of line pressure change on the inertia phase time and the transmission operational characteristics.

At step 1034 a total shift timer T1 is incrementally increased and in step 1035 it is determined if the transmission is undergoing an inertia phase or not. This can be done by sampling the rotational speeds of the input and output shafts Nt, No and determining if the ratio Nt/No is between those indicative of the gears between which the shift is being made (see FIG. 11). If it is found that the transmission is undergoing an inertia phase, then a timer T2 is incrementally increased in step 1036.

At step 1037 it is determined if the inertia phase has finished and the shift been completed or not. If the shift is still being made, then the routine goes to end. However, in the event the shift is sensed has having been completed based on the Nt and No inputs then at step 1038 the shift status flag FLAG1 is cleared and a self-adjustment flag FLAG2 is set to 1. Further, in this step, the instant value of TH is written as a value THe. The use of this value will also become understood when a disclosure of the flow chart shown in FIG. 5 is given.

In the case that the outcome of the enquiry conducted in step 1032 is such as to indicate that no shift is necessary and the instant gear the transmission is condition to produce meets the instant engine load and vehicle speed requirements, then the routine flows to step 1039 wherein the status of the self-adjustment flag is ascertained.

If the FLAG2 has not been set then the routine goes to end. On the other hand if FLAG2=1 then at step 1040 a self-adjustment sub-routine is run. This sub-routine is such as to update the data which is recorded in the map illustrated in FIG. 7.

Figure 6:
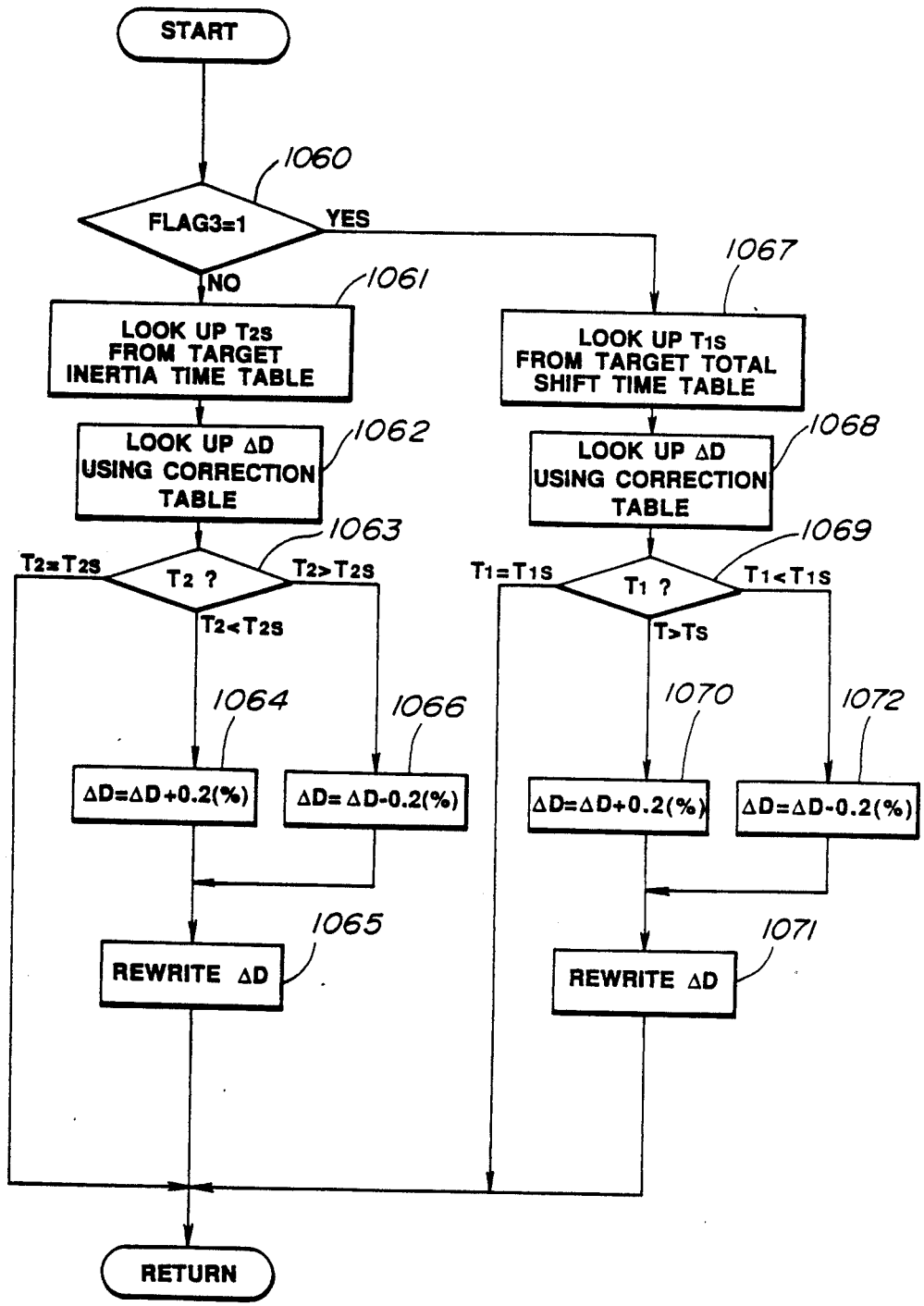

FIGS. 5 and 6 show a correction amount revision mode selection and self-updating control sub-routines which are sequentially run one after the other.

The first step of the correction amount revision mode selection program is such as to determine if a decision to upshift the transmission has been made or not. If not the routines returns without inducing the running of the self-updating control program. However, in the case a decision to upshift has been made, the routine flows to step 1051 wherein the particular type of upshift is determined. For example, it is determined if the shift is a 1-2, 1-3, 2-3, or a 3-4 type upshift. In accordance with this determination a basic learning mode value C for the instant type of shift is read out of RAM in step 1052. This C value is such that in the case of a 1-2 upshift for example, $C = \frac{1}{8}$ while the cases of 2-3 and 3-4 upshifts, C=2/8 and 0/8 respectively.

At step 1053 an average throttle opening value THm is derived. This value is derived by averaging the values THs and THe recorded in steps 1032 and 1038 respectively. At step 1054 the value of THm is compared with the value of C read out in step 1052. In the event that THm<C then at step 1055 then a self-adjusting mode flag FLAG3 is set.

In the self-updating control sub-routine shown in FIG. 6 the status of FLAG3 is checked. In the case that the flag has not been set (viz., FLAG3=0) then at step 1061 a target inertia table is used to enable a look up of a target inertia time $T_{2s}$ which will be achieved via the application of a line pressure having a level which reduces shift shock and prolongs the working life of the friction element or elements at ultra low throttle openings. At step 1062 the a duty cycle correction amount ΔD is obtained by table look up using the above mentioned duty cycle correction table.

At step 1063 the inertia phase time T2 (determined in step 1036) is compared with the $T_{2s}$ value. In the event that $T2 = T_{2s}$ then the correction amount ΔD is used without modification to control the level of line pressure during the shift and the routine returns. However, in the event that $T2 > T_{2s}$ it is indicated that the line pressure level is insufficient and is such to invite slippage which will induce overly rapid wear in the friction elements. Accordingly, at step 1064 the ΔD value is incriminated by 0.2%. With this procedure, each time the instant sub-routine is run the level of line pressure increased by small increments until such time it assumes a level whereat excessive slippage is obviated and $T2 = T_{2s}$.

On the other hand, if $T2 < T_{2s}$ then the value of ΔD is decremented by 0.2% each run until such time as the appropriate level is reached and the generation of shift shock attenuated to the desired level.

At step 1065 the line pressure correction value ΔD as modified in step 1064 or 1066 is written into RAM for use on the next run. This ensures that the level of line pressure will tend toward that which is optimal for the instant type of shift operation.

On the other hand, if the self adjusting mode flag FLAG3 has been set, then the routine flows from step 1060 to 1067 wherein a total shift time value $T_{1s}$ is looked up from a target total shift time table using the instant TH value.

Steps 1069 to 1071 are essentially the same as steps 1063 to 1065 with the exception that the total shift time T1 derived in step 1034, is compared with a target total shift time $T_{1s}$.

Following the completion of steps 1065 or 1071 the routine goes to step 1041 wherein FLAG2, FLAG3, Timer 1 and Timer 2 are cleared via resetting to 0. Accordingly, until FLAG2 is set=1 (indicating that new inertia time data is available) the routine does not pass through step 1040 and the sub-routines of FIGS. 5 and 6 are not run.

With the above described correction method, the line pressure duty can be corrected during shifting by modifying the duty D with the ΔD value and the appropriate line pressure level provided during upshifts at ultra low throttle settings despite the relatively small changes in inertia time with respect to throttle position which occur under such conditions. Accordingly, friction element slippage and shift shock can be attenuated in a desirable manner.

However, it should be noted that in addition the low throttle upshifts, the above disclosed correction technique also compensates for the considerable effect of the hydraulic fluid temperature changes and the like on the shifting characteristics under normal load conditions.

It will be noted that the present invention is not limited to use at low throttle settings and may be applied at higher loads if so desired.

The following documents are incorporated by reference. These documents relate to the same type of transmission as the instant instant invention and disclose, among other features, the manner in which the shift solenoids are controlled. Viz., in the above mentioned arrangements the rotational speed of the transmission input shaft is also monitored and used in combination with the vehicle speed signal (e.g. the rotational speed of the transmission output shaft) and used to develop a gear ratio which can be used to control the setting of the shift control solenoids.

1. U.S. Ser. No. 07/330,129 filed on Mar. 29, 1989 in the name of Narita;
2. U.S. Ser. No. (not yet available) filed on May 5, 1989 in the name of Asono et al (claiming priority based on Japanese Patent Application No. p63-109101;
3. U.S. Ser. No. (not yet available) filed on Apr. 11, 1989 in the name of Narita (claiming priority based on Japanese Patent Application No. p63-87389); or
4. U.S. Ser. No. (not yet available) filed on Apr. 14, 1989 in the name of Narita (claiming priority based on Japanese Patent Application No. p63-91813).

Of course the present invention is not limited to the above type of transmissions wherein shifting is controlled in response to solenoid operation and can be applied to other types of transmission wherein shifting (merely by way of example) is controlled in response to throttle and governor pressures which are developed by mechanically operated valves.

What is claimed is:

1. A transmission line pressure control arrangement for controlling line pressure for a whole transmission comprising:
   a transmission input shaft rotational speed sensor;
   a transmission output shaft rotational speed sensor;
   means for deriving a ratio of transmission input shaft rotation speed to transmission output shaft rotational speed;
   total shift time determining means for determining a single total shift time which elapses between a point in time when a shift command is issued and a point in time when said ratio is detected as having changed from a first value indicative of a first predetermined gear to a second value indicative of a second predetermined gear; and
   means for adjusting line pressure for said whole transmission in a manner which brings said total shift time to a target value for an instant shift.

2. A method of controlling transmission line pressure comprising the steps of:
   sensing a transmission input shaft rotational speed;
   sensing a transmission output shaft rotational speed;
   deriving a ratio of said input shaft rotational speed to said output shaft rotational speed;
   determining a total shift time which is defined between a point in time when a shift command is issued and a point in time when said ratio is detected as having changed from a value indicative of a first predetermined gear to a value indicative of a second predetermined gear; and
   adjusting said line pressure in a manner which brings said total shift time to a target value for an instant shift.

3. A method of controlling transmission line pressure in a transmission which is operatively connected with an engine and which includes means for producing a shift command signal, said engine having a load sensor, comprising the step of:
   sensing rotational speed of an input shaft of said transmission;
   sensing rotational speed of an output shaft of said transmission;
   deriving a ratio of said input shaft rotational speed to said output shaft rotational speed;
   sensing said engine load being below a predetermined value;
   determining total shift time which is defined between a point in time when said shift command signal is issued and a point in time when said ratio is detected as having changed from a value indicative of a first predetermined gear to a value indicative of a second predetermined gear; and
   adjusting said line pressure in a manner which brings said total shift time to a target value for an instant shift.

4. A method of controlling transmission line pressure in a transmission which is operatively connected with an engine and which includes means for producing a shift command signal, said engine having an engine load sensor, comprising the steps of:
   determining a value of a line pressure control signal based on an instant engine load as sensed by said engine load sensor;
   sensing rotational speed of an input shaft of said transmission;
   sensing rotational speed of an output shaft of said transmission;
   deriving a ratio of said input shaft rotational speed to said output shaft rotational speed;
   determining a total shift time, said total shift time being defined by a time which elapses between a point in time when said shift command signal is issued and a point in time when said ratio is detected as having changed from a first value indicative of a first predetermined gear to a second value indicative of a second predetermined gear;
   determining an inertia phase time, said inertia phase time being defined between a point in time following issuance of said shift command signal when a gear ratio deviates from a value indicative of an instant gear ratio and a point in time when said gear ratio assumes a value of a gear which is designated by said shift command signal;
   using said engine load to determine a target total shift time from a first set of pre-memorized data;
   using said total shift time to adjust a value of a line pressure control signal which changes line pressure and which brings said total shift time to a target value for instant shift when said engine load is below a preselected level;
   using said engine load to determine a target inertia time from a second set of pre-memorized data; and
   using said inertia time in place of said total shift time to adjust said value of said line pressure control signal in a manner which changes said line pressure and which brings inertia time to said target inertia time when said engine load is above said preselected level.

5. A line pressure control arrangement for a transmission which is operatively connected with an engine and which includes means for producing a shift command signal, said engine having an engine load sensor, comprising:
- means for determining a value of a line pressure control signal based on an instant engine load as sensed by said engine load sensor;
- means for sensing rotational speed of an input shaft of said transmission;
- means for sensing rotational speed of an output shaft of said transmission;
- means for deriving a ratio of said input shaft rotational speed to said output shaft rotational speed;
- means for determining a total shift time, said total shift time being defined between a point in time when said shift command signal is issued and a point in time when said ratio is detected as having changed from a value indicative of a first predetermined gear to a value indicative of a second predetermined gear;
- means for determining an inertia phase time said inertia phase time being defined between a point in time following issuance of said shift command signal when said gear ratio deviates from a value indicative of an instant gear ratio and a point in time when said ratio assumes a value of a gear which is designated by said shift command signal;
- means for using said engine load to determine a target total shift time from a first set of prememorized data;
- means for using said total shift time to adjust a value of a line pressure control signal which changes line pressure and which brings said total shift time to a target value for an instant shift when said engine load is below a preselected level;
- means for using said engine load to determine a target inertia time from a second set of prememorized data; and
- means for using said time to adjust said value of said line pressure control signal in a manner which changes said line pressure and which brings said inertia time to said target inertia time when said engine load is above said preselected level.

6. In a vehicle:
- an engine;
- an engine load sensor for sensing a load on said engine;
- a transmission, said transmission being operatively connected with said engine by clutch means, said transmission including a plurality of friction elements, an input shaft and an output shaft;
- a transmission control arrangement, said transmission control arrangement including,
- a single line pressure control valve, said single line pressure control valve being arranged to control a level of line pressure which is used to control engagement of all of said plurality of friction elements, said single line pressure control valve being responsible to a single line pressure control signal and
- a shift control valve, said shift control being responsive to a shift command signal to selectively supply line pressure to said friction elements;
- a transmission input shaft rotational speed sensor for sensing rotational speed of said input shaft;
- a transmission output shaft rotational speed sensor for sensing rotational speed of said output shaft;
- a control unit, said control unit being responsive to an output of said engine load sensor, said transmission input shaft rotational speed sensor and said transmission output shaft rotational speed sensor, said control unit including,
- means for producing said shift command signal, said shift command signal designating which shift said transmission should undergo;
- producing said single line pressure control signal;
- deriving a ratio of said input shaft rotation speed to said output shaft rotational speed;
- determining a total shift time, said total shift time being defined by a time which elapses between a point in time when said shift command signal is issued and a point in time when said ratio is detected as having changed to a gear nominated by said shift command signal;
- using said engine load to determine a target total shift time from a first set of pre-memorized data; and
- using said total shift time to adjust a value of said line pressure control signal in a manner which changes said level of said line pressure and which brings said total shift time to a target value for a shift designated in said shift command signal, only when said engine load is below a preselected level.

7. A combination as claimed in claim 6 wherein said control unit further includes:
- means for determining an inertia phase time, said inertia phase time being defined between a point in time following issuance of said shift command signal when a gear ratio deviates from a value indicative of an instant gear ratio and a point in time when said gear ratio assumes a value of a gear which is designated by said shift command signal;
- using said engine load to determine a target inertia time from a second set of pre-memorized data; and
- using said inertia time in place of said total shift time to adjust said value of said line pressure control signal in a manner which changes said line pressure and which brings said inertia time to said target inertia time when said engine load is above said preselected level.

8. A combination as claimed in claim 6 wherein said control unit further includes:
- means for determining a type of shift which is nominated in said shift command signal and
- varying said preselected level in accordance with said type of shift which is nominated.

9. A transmission line pressure control arrangement comprising:
- a single line pressure control valve which controls the level of line pressure which is supplied to a whole transmission;
- means for deriving a ratio of transmission input shaft rotational speed to transmission output shaft rotational speed based on signals form a first sensor which directs rotational speed of a transmission input shaft and a second sensor which detects rotational speed of a transmission output shaft;
- total shift time determining means for determining a first point in time at which a shift command is issued, and a second point in time at which said ratio is detected as having changed from a value indicative of a first predetermined gear to a value indicative of a second predetermined gear, and
- for determining a single time which elapses between said first point in time and said second point in time; and
- means for adjusting operation of said single line pressure control valve in a manner which brings said single time to a target value for a shift designated in said shift command.

* * * * *